United States Patent
Neuzil

[15] 3,686,342

[45] Aug. 22, 1972

[54] AROMATIC HYDROCARBON SEPARATION BY ADSORPTION

[72] Inventor: Richard W. Neuzil, Downers Grove, Ill.

[73] Assignee: Universal Oil Products Company, Des Plaines, Ill.

[22] Filed: Sept. 18, 1970

[21] Appl. No.: 73,466

[52] U.S. Cl. .............................. 260/674 SA, 208/310
[51] Int. Cl. ............................................... C07c 7/12
[58] Field of Search ................. 260/674 SA; 208/310

[56] References Cited

UNITED STATES PATENTS

| | | | |
|---|---|---|---|
| 3,133,126 | 5/1964 | Fleck et al. | 260/674 |
| 3,558,732 | 1/1971 | Neuzil | 260/674 |
| 3,126,425 | 3/1964 | Eberly et al. | 260/674 |

*Primary Examiner*—Delbert E. Gantz
*Assistant Examiner*—C. H. Spresser
*Attorney*—James R. Hoatson, Jr. and Robert W. Erickson

[57] ABSTRACT

An improved adsorptive separation process for the separating of at least one $C_8$ aromatic hydrocarbon from a hydrocarbon feed containing a mixture of $C_8$ aromatic hydrocarbons which process employs a crystalline aluminosilicate adsorbent to selectively adsorb one $C_8$ aromatic from the feed. The improvement basically comprises employing a desorbent containing para-diethylbenzene to increase the selectivity of crystalline aluminosilicate for a given feed aromatic and thereby allowing a more efficient separation with a higher purity extract stream recovered from the process.

28 Claims, No Drawings

AROMATIC HYDROCARBON SEPARATION BY ADSORPTION

BACKGROUND OF THE INVENTION

1. Field of the Invention

The field of art to which the claimed invention pertains is hydrocarbon separation. More specifically, the claimed invention relates to the separation of $C_8$ aromatic hydrocarbons by incorporating a solid crystalline aluminosilicate adsorbent which selectively removes at least one aromatic component from the feed. The selectively adsorbed component is then recovered from the adsorbent through a desorption step employing a desorbent containing para-diethylbenzene.

2. Description of the Prior Art

It is known in the separation art that certain adsorbents generally comprising crystalline aluminosilicates can be utilized to separate certain hydrocarbons from mixtures thereof. It is generally recognized that certain crystalline aluminosilicates containing selected cations at the cationic sites within the zeolite enhance the selectivity of the zeolite for given $C_8$ aromatic hydrocarbon.

In selecting a desorbent for use in a $C_8$ aromatic hydrocarbon separation process it is necessary that a desorbent material be able to displace the selectively adsorbed $C_8$ aromatic from the feed so that the selectively adsorbed aromatic can be recovered from the adsorbent and thereafter separated with ease from the desorbent as a relatively rich product. In certain adsorptive-separation processes the selectively retained component of the feed can be recovered in a purging desorption step in which the adsorbent is contacted with a gas at an elevated temperature or reduced pressure or both to effect the removal of the adsorbed material from the adsorbent. In these type operations the readily adsorbed material is very easy to separate from the gaseous material particularly if the adsorbed material is in a liquid state. However, in certain type operations in which relatively iso-thermal and isobaric operations are employed to effect adsorption and subsequent recovery of a particular feed component of the feed stock, the desorption step is generally carried out by using a desorbent material which can physically displace the adsorbed feed components from the adsorbent.

In $C_8$ aromatic separation processes in which the displacement technique is used to recover a selectively adsorbed feed component from feed mixture, the desorbent material must be able to relatively easily displace adsorbed feed hydrocarbons while also being able to be displaced by the selectively adsorbed components of the feed stock so that the adsorbent may be continuously used. Generally, the hydrocarbons which are selected for use as desorbent materials of xylenes to be separated include the aromatic type hydrocarbons as they are able to displace the $C_8$ aromatic hydrocarbons from the zeolitic type adsorbents. In many instances paraffins and naphthenes are not able to desorb adsorbed $C_8$ aromatics from the zeolite adsorbents and are generally not employed as displacing agents but may be included in a desorbent as an inert diluent which can be used to help physically push off unwanted feed components which cling or are present within the interstitial void spaces of adsorbent particles from adsorption operations.

The desorbents which can be used in the separation processes fall into two general categories, namely, desorbents having boiling points lower than feed components and desorbents having boiling points greater than the desorbent. In order to easily separate desorbent from any of the feed stock materials we have assumed fractionation techniques will be used and therefore a required differential end boiling point is necessary in order to allow a separation by these techniques. I have previously disclosed the problems encountered when using desorbents having lower boiling points than the $C_8$ aromatic hydrocarbons in my co-pending application, Ser. No. 823,932, filed on May 12, 1969, now U.S. Pat. No. 3,558,732, Jan. 26, 1971.

In some instances higher boiling desorbents are required to be used particularly in instances in which an adsorptive separation unit is coupled up with an isomerization unit to allow the increased production of a desired adsorbed component of the feed stock. There are problems associated with the isomerization unit which allow naphthene components to be formed which boil within the boiling range of toluene when it is used as a desorbent. The problem associated with the naphthene contamination is that the naphthene eventually contaminates the desorbent.

In instances in which desorbents are used which boil at temperatures higher than any component of the feed stock it is desired that the desorbent boil with in a reasonable range of the feed stock to reduce the need for high operating temperatures in both the adsorptive-separation process and the fractionation facility. It is generally recognized that higher molecular weight materials are adsorbed and desorbed from zeolite adsorbents at slower rates than the lower molecular weight materials when the operating temperatures are substantially the same. Therefore, a higher operating temperature is imposed upon the separation process when higher molecular weight materials are to be adsorbed to increase the rate of adsorption and desorption. In instances which the higher boiling point desorbent is used elimination of relatively increased operating temperatures can be accomplished by employing desorbents which are above the boiling point of any component in the feed stock yet still within a reasonable boiling range to prevent loss of capacity of the adsorbent which is directly related to the operating temperature of the adsorption process.

I have found that adsorptive separation processes in which a solid zeolitic adsorbent is simultaneously contacted with both a desorbent material and a feed stream under circumstances allowing a competitive adsorption between desorbent material and the selectively adsorbed feed component or components for the adsorptive sites on the adsorbent, that certain higher molecular weight desorbents, hereinafter mentioned, are superior to others. The higher boiling aromatic components which I have found can be used for desorbents include aromatics having up to about 10 carbon atoms per molecules. The aromatic desorbents which fall within the classification having higher boiling points than a $C_8$ aromatic feed mixture yet having less than about 11 carbon atoms per molecule include those aromatic hydrocarbons selected from the group of isopropylbenzene, n-propylbenzene, 1-methyl-3-ethylbenzene, 1-methyl-4-ethylbenzene, 1,3,5-trimethylbenzene, 1-methyl-2-ethylbenzene, tert-butylbenzene, 1,2,4-trimethylbenzene, 1,2,3-trimethylbenzene, 1-methyl-3-propylbenzene, 1-2-diethylbenzene, 1,3-diethylbenzene, 1,4-diethylbenzene, 1-methyl-2-propylbenzene, 1,4-dimethyl-2-ethylbenzene, 1,3-dimethyl-4-ethylbenzene, 1,2-dimethyl-3-ethylbenzene, 1, 2,4,5-tetramethylbenzene, 1,2,3,5-tetramethylbenzene, 1,2,3,4-tetramethylbenzene, 1,2,3,4-tetrahydronaphthalene and naphthalene. Of all of the aromatic desorbent materials which have been mentioned above we have found that the diethylbenzene materials allow the best desorbent operations and do not substantially adversely affect the operations when there is a competitive adsorption takes place between feed components and the desorbent. Of the diethylbenzenes disclosed, I have found that para-diethylbenzene is the best desorbent which can be used for good separation to take place. The para-diethylbenzene does not adversely influence adsorptive capacity or rate of adsorption and desorption when it is competitively adsorbed by the adsorptive sites of the adsorbent when in admixture with the feed stock.

I have previously recognized the inferiority of benzene as a desorbent in the process in which a lower boiling desorbent material is used and is in contact with and surrounding the adsorbent during the adsorption of a selected feed component in adsorptive separation process. The general consensus has been that benzene and toluene were generally equivalent in their capacities as desorbents. Benzene and toluene are substantially equivalent in their desorption characteristics in the adsorptive separation process as generally characterized as equilibrium adsorptive type operations. The same holds for the diethylbenzene and many of the other aromatic components described above which are higher boiling than xylene feed stock components. However, in operations characterized as less than equilibrium adsorptive type operations there is a distinct advantage for using para-diethylbenzene as a desorbent component.

The equilibrium adsorptive operations essentially take place in the sequence of steps in which a feed stream which does not contain any desorbent material is passed through a zeolitic adsorbent bed until the effluent stream which passes out of the adsorbent after contact therewith is essentially of the same composition as the material fed to the adsorbent bed indicating no net transfer of material between the adsorbed material within the adsorbent and the feed stock surrounding the adsorbent. A desorbent material of higher boiling point than the feed mixture is then passed through the bed of adsorbent to displace the selectively adsorbed components of the feed. In this type sequential operation there is not desorbent in contact with the adsorbent when adsorption operations are completed (any desorbent present on the adsorbent is displaced by feed components).

In continuous simulated or actual countercurrent liquid flow systems in which a pre-determined component of the feed is continuously and selectively adsorbed from a feed mixture by a solid adsorbent, there are zones in which there is essentially a simultaneous contacting of the adsorbent during adsorption with a mixture comprising desorbent material and the feed material. The presence of feed and desorbent material in admixture creates a condition where there is a competitive adsorption on the adsorbent of both desorbent material and the selectively adsorbed component of the feed material.

In most continuous countercurrent solid-fluid separation process, the solid adsorbent contacts the feed mixture in what is generally referred to as an adsorption zone. The feed and solid adsorbent countercurrently contact each other with the adsorbent passing out of the adsorption zone containing the selectively adsorbed component of the feed and some desorbent within the solid adsorbent. The solid adsorbent is eventually contacted with desorbent material in a desorption zone. The desorbent material displaces a selectively adsorbed component of the feed from the solid adsorbent and allows a mixture of desorbent and a selectively adsorbed component of the feed to be removed from the process as an extract stream. The extract stream eventually passes to a separation means wherein the desorbent material is separated from the selectively adsorbed feed component giving an enriched stream of the selectively adsorbed component of the feed. The solid adsorbent after being contacted with the desorbent in the desorption zone, continues to flow in a countercurrent direction in relation to the fluid flow in the system and eventually is recontacted with the feed in an adsorption zone for the adsorption of the selectively adsorbed component of the feed by the solid adsorbent. Between the adsorption zone and desorption zone are located the flushing or rectification zones which by carefully controlled pressure drops and liquid flow prevent the raffinate on extract streams from contaminating each other. The material contained in the flushing or rectification zones generally contains desorbent material. The desorbent in the flushing or rectification zones flushes a raffinate material carried by the solid adsorbent back into the adsorption zone and eventually ends up contacting the adsorbent in the adsorption zone substantially the same time the feed mixture contacts the solid adsorbent in the adsorption zone. The desorbent which contacts the adsorbent in the adsorption zone causes competitive adsorption between it and the circularly adsorbed component of feed. It can affect selectively of the adsorbent for the required separation.

I have found that by employing a desorbent containing para-diethylbenzene in an adsorptive separation process in which a heavier boiling desorbent is used as compared to the feed components that when para-diethylbenzene is present while adsorption of feed component takes place improved separation is obtained.

SUMMARY OF THE INVENTION

It is an object of improved process of this invention to employ a desorbent containing para-diethylbenzene to improve the performance of adsorbent in an adsorptive-separation process in which the desorbent material is a heavier boiling material than the feed component aromatic mixture. Adsorption or retention of one or more components of hydrocarbon feed mixture by a solid adsorbent as defined in this specification shall include the holding of a compound by the adsorbent by electrostatic chemisorption forces.

In adsorptive-separation processes an important factor used to determine the ability of a particular adsorbent to separate components of a feed mixture is the selectivity (B) of the adsorbent for one component as compared to another component. The selectivity used throughout this specification for two given components is defined as ratio of the concentration of two components in the adsorbed or retained phase within the adsorbent over the ratio of the same two components in the unadsorbed phase. Expressed in equation form, selectivity is shown in Equation 1 below, $$\text{Selectivity} = B_{x/y} = \frac{[\text{Vol. \% } x/\text{vol. \% } y]a}{[\text{Vol. \% } x/\text{vol. \% } y]u} \quad (1)$$

wherein $x$ and $y$ are the two components of the feed represented in volume percent and subscripts $a$ and $u$ represent the adsorbed and unadsorbed phases respectively. The conditions at which the selectivity was measured were determined when the feed passing over the bed of adsorbent did not change the composition after contacting the bed of adsorbent. In other words, where there was no net transfer of material occurring between the unadsorbed feed and the adsorbed phase when the selectivity was measured.

As can be seen, as selectivity of the two components approaches unity there is no preferential adsorption of one component by the adsorbent. As the selectivity becomes less than or greater than unity there is a preferential selectivity by the adsorbent of one component as compared to another. Comparing the selectivity of component X over component Y, a selectivity larger than unity indicates preferential adsorption of component X within the adsorbent while a selectivity less than unity would indicate that component Y is preferably adsorbed leaving an unadsorbed phase richer in component X.

Equilibrium conditions as defined herein include operations which essentially all of the desorbent material which is contained within an adsorbent prior to being contacted with a feed stream containing essentially no desorbent is displaced from the adsorbent by the subsequent contact with the feed material. This results in an adsorbent which contains essentially no desorbent after adsorption of the selective component of the feed has taken place.

Less than equilibrium or non-equilibrium adsorption conditions are defined as those operations in which desorbent remains within the adsorbent while the feed mixture is being adsorbed within the adsorbent. Non-equilibrium conditions are generally achieved by contacting an adsorbent with a feed mixture which contains desorbent material or by contacting an adsorbent which contains desorbent with a feed stream and only displacing a portion of the desorbent from the adsorbent material.

I have found that when a hydrocarbon feed stream which contains a quantity of desorbent material is contacted with a molecular sieve adsorbent at less than equilibrium conditions that a desorbent containing para-diethylbenzene must be used in order to prevent adsorbent selectivities from being substantially reduced when using a desorbent material having a higher boiling point than any of the feed components.

In adsorptive-separation processes the basic process steps comprise an adsorption step in which a feed component contacts the molecular sieve adsorbent which selectively adsorbs one or more of the components of the hydrocarbon feed stream and a desorption step in which a desorbent material contacts a molecular sieve adsorbent containing the preferably adsorbed components of the feed streams within the adsorbent and displaces the feed components from the adsorbent. The desorbed components of the feed can be collected and separated from desorbent and recovered as relatively high purity product extract streams. The extract material is generally defined as a mixture of desorbent material and a selectively adsorbed component of the feed stock and generally can be passed into a fractionating facility in which a desorbent material can be separated from the adsorbed feed components into a product material. The raffinate material which contains less selectively adsorbed components of the feed stock mixture and desorbed material can similarly be withdrawn from the process and passed into a fractionating facility for separation into a purified desorbent and a purified stream containing the less selectively adsorbed components of the feed stock.

The effects of the correct choice of a desorbent is readily noticed in a continuous countercurrent simulated moving bed process in which less than equilibrium adsorptive conditions are present. In these type processes continuous production of an extract stream rich in the selectively adsorbed component of the feed and a raffinate stream depleted in the selectively adsorbed component feed requires that less than equilibrium adsorption conditions take place. Basic flow scheme for these type processes is disclosed in U.S. Pat. No. 2,985,589. The flow scheme disclosed in this patent is similar but not identical to the flow scheme utilized in the process herein.

In order to reduce the contamination of extract and raffinate streams employing the general flow patterns disclosed in U.S. Pat. No. 2,985,589, a desorbent material is employed as a flushing or rectification material between the adsorption and desorption zones. In the countercurrent flow processes previously described, the solid is first contacted with the feed stream in an adsorption zone after which the solid is removed from the adsorption zone and then contacted with a liquid generally comprising desorbent to remove any raffinate material contained in the adsorbent and between the particles of adsorbent. The solid, after leaving the rectification or flushing zone, then contains substantially no raffinate material adsorbed or retained between the particles of the molecular sieve except of course for the desorbent material and is passed into a desorption zone where the adsorbent is contacted with a high concentration and quantity of desorbent material which displaces the selectively adsorbed component of the feed from the molecular sieve and allows recovery of an extract stream comprising adsorbent and the selectively adsorbed component of the feed. The solid leaving the desorption zone contains adsorbed within the molecular sieve and contained between the particles of the molecular sieve essentially pure desorbent and after leaving the desorption zone passes into a second rectification or flushing zone in which the solid molecular sieve adsorbents are contacted with a small portion of a raffinate material from the next adsorption zone to remove a portion of the desorbent from between the particles of molecular sieve adsorbent. The desorbent displaced from between the spaces of the molecular sieve adsorbent is passed into the desorption zone to effectively reduce the actual quantity of desorbent material needed in the overall process. The molecular sieve is then passed into an adsorption zone wherein the feed contacts the molecular sieve and the entire cycle described above is repeated.

In general most countercurrent operations are effected using a series of alternate zones which extend in a connected series. One aspect of the continuous countercurrent flows separation process is that the operation in this type flow scheme is continuous. This means that a set of adsorption and desorption zones with related rectification or flushing zones are generally stacked in a manner so as to allow continuous closed loop operations to take effect with the continuous production of raffinate and extract streams and a continual use of feed and desorbent materials.

In the countercurrent flow operations there is generally no equilibrium adsorption taking place. This is primarily due to the fact that a quantity of desorbent is generally present within the molecular sieve adsorbent in the adsorption zone during a period of time when feed material is contacting the adsorbent. The feed material is not able to totally remove the desorbent from the solid desorbent located within the adsorption zone. Consequently, the effects of desorbent material on the selectivity of the adsorbent becomes pronounced and requires the selection of a desorbent material which does not adversely alter the adsorbent's ability to retain or selectively adsorb a given component of the feed.

The $C_8$ aromatic hydrocarbons which can be used in the feed streams of the adsorptive separation process used herein include ortho-xylene, meta-xylene, para-xylene and ethylbenzene. Other materials that may be included in the feed stream but which are not necessarily detrimental in the performance of this adsorptive separation process include relatively small amounts of paraffins, olefins, naphthenes and other type hydrocarbons that necessarily are found in $C_8$ aromatic streams.

Adsorption conditions include the temperatures within the range from about 30 to about 350° C. and preferably within the range of about 40 to about 250° C. and pressures within the range of atmospheric to about 600 psig. and preferably within the range from about atmospheric to about 400 psig. Both liquid phase and vapor phase operations can be used in the adsorption step and it is preferable to employ liquid phase operations because of the reduced temperature requirements and the decreasing opportunities for any type side reactions to occur in the separation process. Desorption conditions include substantially the same limitations imposed upon in describing the adsorption conditions with a further explanation that desorbtion can take place with a reduction of pressure coupled with increase in temperature, either one or both taking place. Preferably, desorption conditions and adsorption conditions take place at the same temperature and in liquid phase operations. The process of this invention contemplates that both the raffinate and extract streams can be passed into respective fractionating facilities in which the extract stream can be separated into a relatively pure desorbent stream and a relatively pure selectively adsorbed feed component stream. The raffinate stream can similarly be passed into a fractionation facility in which the raffinate material can be separated into a concentrated stream of desorbent material and the less selectively retained feed components. It is contemplated that the relatively purified desorbent streams from both the raffinate and extract streams can be reused in the process of this invention in order that the actual amount of desorbent material consumed by the process is reduced to a minimal amount. It is contemplated that the selectively adsorbed feed stock component can be utilized in other processes or collected and used as the product and used as a purified component itself. The feed components of the raffinate stream can be passed into an isomerization zone in which isomerization conditions take place to produce more of the selectively adsorbed component of the feed stock. The combination isomerization and separation process can allow increase in net yield of the selectively adsorbed component of the feed stock per quantity of liquid feed stock actually used.

The typical fractionating facilities which can be used in the process of this invention include normal fractionators in which the desorbent material is taken as a bottom stream and the selectively adsorbed component of the feed and less selectively adsorbed components of the feed are taken overhead.

Adsorbents which can be used in the process of this invention are generally referred to as the crystalline aluminosilicate zeolites or molecular sieves and can comprise both the natural and synthetic aluminosilicates. A crystalline zeolitic aluminosilicate encompassed by the present invention for use as an adsorbent includes aluminosilicate cage structures in which alumina and silica tetrahedra are intimately connected with each other in an open three dimensional crystalline network. The tetrahedra are cross linked by the sharing of oxygen atoms with spaces between the tetrahedra occupied by water molecules prior to partial or total dehydration of this zeolite. The dehydration results in crystals interlaced with channels having molecular dimensions. Thus the crystalline aluminosilicates are often referred to as molecular sieves. In a hydrated form the crystalline aluminosilicate is represented by the formula in equation 2 below:

$$M_{2/n}O:Al_2O_3:wSiO_2:yH_2O \quad 2.$$

where M is a cation which balances the electrovalence of the tetrahedra and is generally referred to as an exchangeable cationic site, $n$ represents the valence of the cation, $w$ represents the moles of $SiO_2$, and $y$ the moles of water. The cations may be any one of a number of cations which will hereinafter be described in more detail.

Crystalline aluminosilicates which find use as the adsorbent in the process of this invention possess relatively well-defined pore structures. The exact type aluminosilicate generally referred to by the particular silica alumina ratio and the pore dimensions of the cage structures. Faujasites are commonly represented as being closely related to the type X, type Y aluminosilicates and are defined by the varying silica to alumina ratios.

The zeolite type X can be represented in terms of mole oxides as represented in the following equation 3:

$$0.9\pm0.2M_{2/n}O:Al_2O_3:2.5\pm0.5SiO_2:yH_2O \quad 3.$$

where M represents at least one cation having a valence of not more than 3, $n$ represents the valence of M, and $y$ is a value up to about 8 depending upon the identity of M and the degree of hydration of the crystalline. Zeolite type X is described in U.S. Pat. No. 2,882,244.

The type Y zeolite can be represented in terms of the mole ratio of oxides for the sodium form as represented in the following equation 4:

$$0.9\pm0.2Na_2O:Al_2O_3:wSiO_2:yH_2O \quad 4.$$

where $w$ is a value greater than 3 up to about 8, and $y$ may be any value up to about 9. The type Y zeolite is described in U.S. Pat. No. 3,130,007.

Adsorbents contemplated herein include not only the sodium form of the type Y zeolite but also crystalline materials contained from such a zeolite by partial or complete replacement of the sodium cations with other individual cations or groups of cations. Similarly the type X zeolite also ion-exchange and is contemplated for use as a adsorbent process of this invention. The type X or type Y structured zeolites generally refer to those zeolites having overall crystalline structures as described for the type X or type Y zeolites and containing selected cations or pairs of cations at the exchangeable cation sites within the adsorbents.

Cationic or base exchange methods are generally known to those familiar with the field of crystalline aluminosilicate production are generally performed by contacting zeolite with an aqueous solution of soluble salts of the cations desired to be exchanged in the sieves. A desired degree of cation exchange will take place before the sieves are removed from the aqueous solution and dried to a desired water content. It is contemplated that cation exchange operations of the cation exchange may take place using individual solutions of the desired cations to be placed on the molecular sieve or using an exchange solution containing mixtures to the cations desired to be placed on to the crystalline aluminosilicate zeolite.

The cations which may be placed upon crystalline aluminosilicate adsorbent include cations selected from the Group IA, Group IIA, and Group IB metals. The specific cations would show a preferred selectivity for para-xylene with respect to ethylbenzene include lithium, sodium, potassium, rubidium, cesium, beryllium, magnesium, calcium, strontium, barium, silver, manganese, cadmium, and copper. These cations could be used in an adsorptive separation process in which only para-xylene and ethylbenzene are desired to be separated and in instances where the above cations were used the para-xylene would be the preferred selectively adsorbed component of the feed mixture. The following combination of cations have shown to be particularly well suited for a para-xylene and ethylbenzene separation: potassium and barium, potassium and beryllium, potassium and magnesium, rubidium and barium, cesium, and barium, copper and cadmium, copper and silver, zinc and silver, and copper and potassium. The single listed cations above may be combined to provide an effective adsorbent.

Cations which show a preferred selectivity of para-xylene when compared to meta-xylene, which may be used to separate para-xylene when it is in admixture with meta-xylene include potassium, barium, sodium, silver, along with certain cation pairs including potassium and barium, potassium and beryllium, potassium and magnesium, potassium and rubidium, potassium and cesium, barium and rubidium, cesium and barium, and copper and potassium. Additionally the above recited single cations may be used in combination to selectively adsorb para-xylene from a para-xylene and meta-xylene mixture because of the singular cations recited are all in themselves para-xylene selective.

In testing the various adsorbents used with the cations disclosed I have found that in general meta-xylene and ortho-xylene behave in a similar manner indicating that a sieve which is selective for para-xylene with respect to meta-xylene would also have the same degree of selectivity of para-xylene with respect to the ortho-xylene component. Therefore, for a para-xylene and ortho-xylene mixture, the above cation and cation pairs disclosed for the para-xylene and meta-xylene selectivity could be used.

In instances in which ethylbenzene is present either with meta-xylene or ortho-xylene or both ortho-xylene and meta-xylene, it is required that a sieve utilized cations which are able to separate para-xylene from ethylbenzene, meta-xylene and ortho-xylene where para-xylene is desired to be the selectively retained component of the feed. In instances in which a single cation is desired to be placed upon the zeolite adsorbent, I have found that potassium, barium, sodium and silver, all show a preferential selectivity of para-xylene with respect to ethylbenzene, meta-xylene and ortho-xylene and would be a good cation to be used on a sieve where para-xylene is in admixture with meta-xylene, ortho-xylene and ethylbenzene and para-xylene is desired to be the selectively retained component of the feed. The singular cations recited above could also be used in combination since independently they all show a para-xylene selectivity as compared to all of the xylene isomers and ethylbenzene. Certain combination of cations which contain one cation one of which may not be selective towards para-xylene with respect to any of the other xylenes and ethylbenzene include the combination cations of potassium and barium, potassium and beryllium, potassium and magnesium, potassium and rubidium, and potassium and cesium, barium and rubidium, cesium and barium, and copper and potassium.

It is contemplated that in some instances zeolites which have been ion-exchanged may also contain cations which are not selective towards the para-xylene with respect to any of the other xylenes and ethylbenzene but may be upon the sieves in such concentrations as to not adversely affect the selectivity of the cation placed upon the zeolite which has para-xylene selectivity as compared to meta-xylene or ortho-xylene or ethylbenzene. A typical cation which may be located upon the zeolite and for certain operations may not be a good cation but is inherently present in most of the basic zeolites that are started with includes sodium or calcium. These two cations are present on a type X or type Y structured zeolite after the original base zeolite has been manufactured.

When singular cations are base exchanged upon a zeolite, the singular cations can comprise anywhere from 5 up to 75 wt. percent of the zeolite depending upon the molecular weight of the material exchanged upon the zeolite. The percentage is based on a volatile free basis generally expressed as "V.F." and is the percentage of the material upon the zeolite after the zeolite has been exposed to an inert gas purge at 500° C. for a time period to allow the zeolite to reach a constant weight. It is contemplated that when single ions are placed upon the zeolite to be used to selectively adsorb a given feed component that this cation may be ion-exchanged upon the zeolite to replace anywhere from about 1 percent up to about 100 percent of the original cation (generally sodium or calcium) present upon the zeolite prior to its being ion-exchanged. By knowing the empirical formula including the silica over alumina ratio of the zeolite used, its water content and the type of zeolite used whether it be a type X or type Y structured zeolite it is possible to calculate after ion-exchange the percent of ion-exchange that has taken place.

When more than one cation is placed upon the zeolite there are two parameters in which one can operate in order to effectively produce a zeolite having maximum selective properties. One of the parameters is the extent of ion-exchanged of the zeolite which is determined by the length of time and ion-exchange conditions and the other parameter is the ratio of the individual cations placed on the zeolite.

In instances in which the cation pairs comprise a Group IIA metal and a Group IA metal the weight ratio of these two components upon the zeolite can vary anywhere from about less than 1 up to about 80 depending upon the molecular weight of the Group IIA or Group IA metal. A particularly useful zeolite is one which contains barium and potassium cations having a weight ratio of barium to potassium of from about 1 to about 40 and preferably in the range of from about 1 to about 30. A ratio of from 5 to 15 is an especially preferable range. The cations when using Group IIA and Group IA metals can occupy from about 20 up to about 100 percent of the ion-exchangeable sites located upon the zeolite. In some instances, substantially all of the original cations placed upon the zeolite are removed therefrom by the cation exchange.

The cations which do not include the Group IA or Group IIA metals may be placed upon the zeolite in order that from about 10 percent to about 100 percent of the original cations present within the zeolite are replaced by these cations. Where a plurality of cations are utilized, a weight ratio of the cations can be utilized which allows para-xylene to be selectively adsorbed with respect to meta-xylene, ortho-xylene and ethylbenzene.

Desorbents which can be used in the process of this invention include the diethylbenzene isomers including para-diethylbenzene, meta-diethylbenzene, and ortho-diethylbenzene along with small quantities of the butylbenzenes which can be present in processes which produce the diethylbenzene materials as products. It is preferable to use a desorbent which contains essentially para-diethylbenzene as a desorbing component of the desorbent. The typical ranges and concentrations of para-diethylbenzene when used as the sole diethylbenzene present in the desorbent material can vary anywhere from a few percent up to about 100 percent by volume of the total desorbent material passed into the adsorption process and preferably can be within the range of from about 5 to about 60 vol. percent with an even more preferable range being within the range from about 30 to about 50 vol. percent of the total desorbent material. In instances in which the mixed diethylbenzenes are used as a component in a desorbent they are present in an undiluted form and typically mixtures containing roughly about 60 vol. percent meta-diethylbenzene, 7 vol. percent ortho-diethylbenzene, and 26 vol. percent para-diethylbenzene along with approximately 7 vol. percent of butylbenzenes can makeup a mixed diethylbenzene desorbent material which contains para-diethylbenzene as a desorbing component. The diluents which can be used with a desorbent include materials such as saturated type hydrocarbons, including the paraffinic type hydrocarbons and cyclo-paraffins, and additionally the carbo-cyclic ring compounds. Typically, the diluent materials from the saturated paraffin group consist of the straight or branched chain paraffins having from about four to about 20 carbon atoms per molecule and preferably having from about four to about 10 carbon atoms per molecule. Cyclo-paraffins can include the cyclo-hexane, cyclo-pentanes, and branched derivatives thereof. Additional carbo-cyclic ring compounds including Decalin and Decalin derivatives containing branched chains can be utilized and are preferred as one diluent to be used in the process of this invention.

In testing various adsorbent the selectivity ($B_{x/y}$) as defined previously was determined using apparatus and procedures as described below. The apparatus used to measure the selectivity of a particular adsorbent consisted of a chamber of approximately 40 cc volume having inlet and outlet ports at opposite ends of the chamber. The chamber was contained within a temperature controlled heating means and in addition pressure control equipment was used to operate the chamber at a constant predetermined pressure. Attached to the outlet line connected to the outlet of the chamber there was chromatographic analysis equipment which was used to analyze the effluent stream leaving the adsorbent chamber.

The following general procedures were used to determine the B for various adsorbents testing in the chamber. A feed mixture having a known composition and which contained no desorbent material was passed through the adsorbent chamber at a regulated pressure and temperature until all desorbent on the adsorbent from a previous step was removed and the effluent composition flowing from the adsorbent chamber remained at a constant composition. This indicated that there was no net transfer between the adsorbed phase within the adsorbent and the unadsorbed or external phase surrounding the sorbent particles and that equilibrium operations were taking place. A second mixture containing a hydrocarbon (desorbent) which was able to desorb the previously adsorbed component or components of the feed from the adsorbent was then passed through the adsorbent chamber. The chromatographic analysis equipment was used to monitor the unadsorbed or external phase and the material desorbed from within the adsorbent. Knowing the compositions of these two streams the B for various components present in the feed stream could be determined.

The feed streams which were used to illustrate the process of this invention in the aforementioned testing apparatus consisted of equal quantities (8 ⅓ vol. percent each) of ethylbenzene, para-xylene and meta-xylene mixed with 2,2,4-trimethylpentane rendering a feed mixture containing 75 vol. percent paraffinic material and 25 vol. percent $C_8$ aromatic material. The $C_8$ aromatics were diluted in the paraffin material to facilitate ease of analyzing the adsorbed and unadsorbed phases for B determination. Ortho-xylene was excluded, since its presence would have complicated the analytical procedures, although previous experiences indicated that the ortho-xylene isomer behaved substantially the same as the meta-xylene isomer. The desorbent material consisted of 25 vol. percent toluene, 74 vol. percent 2,2,4-trimethylpentane and 1 vol. percent neohexane which was used as a tracer to determine desorbent breakthrough in the effluent stream leaving the adsorbent chamber during desorption operations.

The adsorbents used herein to illustrate the process of this invention were originally either the sodium type X or type Y structured zeolites which contained cations as is indicated by their individual description. The adsorbents indicated as containing a single cation were essentially totally ion exchanged and generally contained less than about 2 wt. percent residual sodium based on volatile free adsorbent — that is less than 2 wt. percent residual sodium based on the adsorbent after being subjected to 900° C. calcination temperatures to drive off volatile material. The adsorbents which contained two different cations were also essentially totally ion exchanged with respect to the two indicated cations.

EXAMPLE I

In this example, type Y zeolites are used. The zeolite was essentially totally ion exchanged with the indicated cation and was tested for para-xylene/ethylbenzene selectivity ($B_{p-x/EB}$) and for para-xylene/meta-xylene selectivity ($B_{p-x/M-x}$) using the procedures previously described. The results are indicated in Table I below.

TABLE I

| SIEVE DESCRIPTION | SELECTIVITY $B_{p-x/M-x}$ | $B_{p-x/EB}$ |
| --- | --- | --- |
| Group IA Metals: | | |
| Type Y, lithium exchanged | 0.72 | 1.52 |
| Type Y, sodium exchanged | 0.75 | 1.32 |
| Type Y, potassium exchanged | 1.83 | 1.16 |
| Type Y, rubidium exchanged | 0.96 | 1.51 |
| Type Y, cesium exchanged | 0.80 | 1.50 |
| Type X, sodium exchanged | 1.02 | 1.15 |
| Group IIA Metals: | | |
| Type Y, beryllium exchanged | 0.91 | 1.08 |
| Type Y, magnesium exchanged | 0.59 | 1.67 |
| Type Y, calcium exchanged | 0.35 | 1.17 |
| Type Y, strontium exchanged | 0.44 | 1.40 |
| Type Y, barium exchanged | 1.27 | 1.85 |
| Others | | |
| Type Y, nickel exchanged | 0.70 | 1.27 |
| Type Y, copper exchanged | 0.62 | 1.46 |
| Type Y, silver exchanged | 1.02 | 1.19 |
| Type Y, manganese exchanged | 0.66 | 1.25 |
| Type Y, cadmium exchanged | 0.61 | 1.19 |

EXAMPLE II

In this example the zeolite was essentially totally ion exchanged with an aqueous mixture containing the two cations desired to be placed on the zeolite adsorbent. The adsorbents which contained both Group IA and Group IIA cations were ion exchanged in a manner which resulted in a mol ratio of the Group IIA metal over the Group IA metal of about 3:1 on the zeolite while the adsorbents containing the Group IA metals combination were exchanged in a manner which resulted in a mol ratio of the two Group IA metals of about 1:1. The copper-potassium sieve tested contained a mol ratio of copper over potassium of about 3:1. The adsorbents were tested in accordance with the previously described procedures and the results of the test are reported in Table II below.

TABLE II

| SIEVE DESCRIPTION | SELECTIVITY $B_{p-x/M-x}$ | $B_{p-x/EB}$ |
| --- | --- | --- |
| Group IA+IIA Metals: | | |
| Type Y, K+Ba exchanged | 3.76 | 2.10 |
| Type Y, K+Be exchanged | 2.11 | 1.44 |
| Type Y, K+Mg exchanged | 2.25 | 1.41 |
| Type Y, Rb+Ba exchanged | 2.05 | 1.41 |
| Type Y, Cs+Ba exchanged | 1.57 | 1.30 |
| Type X, K+Ba exchanged | 2.49 | 2.03 |
| Group IA Metals: | | |
| Type Y, K+Rb exchanged | 1.80 | 1.06 |
| Type Y, K+Cs exchanged | 1.79 | 1.03 |
| Others: | | |
| Type Y, Cu+K exchanged | 1.65 | 1.19 |

From the data shown in this Example and Example I above it can be seen that the various cations or groups of cations which were tested for xylene separation and in particular the selective adsorption of para-xylene when compared to the other xylenes and ethylbenzene showed varying selectivities. It is thought that the reason that various cations of a given group act in different and sometimes an opposite type ways as far as selectivity is concerned has to do with the basicity or acidity of the zeolite in comparison to the degree of acidity of basicity of the particular xylene isomers desired to be selectively adsorbed upon the adsorbent.

Data generated for Example I and II utilize equilibrium adsorption conditions. These conditions effected adsorption and desorption of components of the feed stock without the desorbent material being present either within a feed stock or within the adsorbent after complete adsorption conditions had taken place. Since equilibrium adsorption conditions were taking place when the selectivities were measured, there is no noticeable difference in the selectivities of the adsorbent when most hydrocarbon desorbents are used. Although the type of hydrocarbon desorbent used may not alter the selectivity of the adsorbent when using equilibrium adsorption conditions the quantity of the desorbent necessary to remove selectively adsorbed components of the feed stock from the adsorbent may vary by a great amount. For instance, when using a paraffinic type desorbent which for all practical purposes does not readily desorb adsorbed feed stock from the zeolite, only the mass action effects of the large quantity of paraffinic desorbent surrounding the adsorbent particles would help to desorb the selectively absorbed feed component from the adsorbent. Desorption which would take effect would generally come about from the equilibrium reached between the large quantity of paraffinic desorbent surrounding the adsorbent material and the feed stock in which an aromatic or other type desorbent is used, desorbent selectivity approaches that or sometimes may even be higher than that of para-xylene and there is a true pushing off of the selectively adsorbed component of the feed stock by the desorbent material, in these cases, a relatively small emphasis is placed upon the equilibrium mass actions to effect the desorption operations and lower desorbent requirements are present.

EXAMPLE III

In this Example non-equilibrium adsorption conditions were utilized during the adsorption operations using a desorbent material which contained para-diethylbenzene. In some instances the desorbent was a para-diethylbenzene isomer diluted in a cyclic paraffin namely Decalin or in a paraffinic hydrocarbon typically iso-octane. In other instances a desorbent was utilized which contains para-diethylbenzene along with other diethylbenzene isomers and butylbenzene. Table III below shows the various desorbent compositions used in this example.

TABLE III

Desorbent Analysis

| Desorbent Type | D | E | F |
|---|---|---|---|
| Components, vol.% | | | |
| Meta-diethylbenzene | 60.4 | | |
| Ortho-diethylbenzene | 7.4 | | |
| Para-diethylbenzene | 25.6 | 10.0 | 10.0 |
| Butylbenzenes | 6.6 | | |
| Decalin | | | 90.0 |
| Iso-octane | | 90.0 | |
| | Total: 100.0 | 100.0 | 100.0 |

The equipment used for testing the adsorbent and various desorbents in this Example was essentially an adsorbent chamber containing approximately 70 cc. of a selected adsorbent and contained in a 6-foot ⅜ inch outside diameter copper column. The copper column was contained within the heat-control means in order to maintain essentially isothermal operations throughout the adsorption column. The column was maintained at a temperature of approximately 150° C. Feed and desorbent streams were preheated in order that isothermal operations would take place. Gas chromatographic analysis equipment was attached to the effluent stream leaving the adsorbent chamber in order to determine the composition of the streams when desired at given time intervals. Knowing the feed rate into and out of the adsorbent chamber, the temperature, the feed and desorbent compositions and the particular chromatograph pattern shown by the effluent materials leaving the column, it was possible to determine concentrations of the components in the adsorbed and unadsorbed phases. Knowing this data the selectivity, as defined in equation 1 above, was determined for any of two given components.

The operations taking place were as follows. The desorbent was run continuously at a nominal 1 liquid hourly space velocity (LHSV) which amounted to about 1.17 cc. per minute feed rate of desorbent. At some convenient time interval the desorbent is stopped and the feed is run for a 10-minute interval at 1 LHSV. The desorbent stream is then resumed at 1 LHSV and continued to pass into the adsorption column until all of the feed $C_8$ aromatics have been eluded from the column by observing the chromatograph generated by the effluent material leaving the adsorption column. The sequence of operations usually takes about an hour. The 10 minute pulse of feed and subsequent desorption may be repeated in sequences as often as is desired.

To evaluate performance of the adsorbents, the distance in cc. of desorbent pumped, between the mid-point of the normal-nonane tracer peak envelope and the mid-point of the $C_8$ aromatic peak envelopes was measured.

The selectivity (B) for para-xylene with respect to the other $C_8$ aromatics is the ratio of the distance between the center of the para-xylene peak envelope and the $C_9$ tracer peak envelope to the corresponding distances for ethylbenzene, meta-xylene and ortho-xylene.

Three separate feed stocks were utilized in this experiment to show the advantages of utilizing a para-xylene during non-equilibrium feed stock. The feed stocks contained various quantities of the individual desorbents which were used to desorb the selectively adsorbed para-xylene from the adsorbent. The three feed stocks are shown in Table III below and are labeled feed stock A, B, and C. Feed stock A contain a 5 vol. percent distribution of each the $C_8$ aromatics utilized in the study along with 67.5 vol. percent iso-octane and 7.5 vol. percent para-diethylbenzene. Feed stock A was used to show the effects of utilizing para-diethylbenzene desorbent when mixed with a paraffinic hydrocarbon during non0-equilibrium adsorption conditions.

Feed stock B contained a 5 vol. percent distribution of four $C_8$ aromatics along with a desorbent mixture containing 7.5 vol. percent para-diethylbenzene and 67.5 percent Decalin. The Decalin and para-diethylbenzene mixture was added in order that the density differences found to have adverse effects upon the separation when using feed stock A could be eliminated by using a diluent which more closely resembled the density of the $C_8$ aromatic feed stocks and the para-diethylbenzene.

Feed stock C was also used in non-equilibrium adsorption operations and contained in addition to the four $C_8$ aromatic isomers contained a distribution of diethylbenzene isomers plus other $C_{10}$ materials. All the feed stocks A, B and C contain 5 vol. percent of normal nonane which was used in the chromatographic analyses as a tracer to determine when the elution of the feed stock had begun. The normal nonane had no adverse or beneficial affects towards selectivity or flow rates into and out of the zeolite.

Detailed analysis of the feed stocks utilized are shown in Table IV below:

TABLE IV

Feed Stock Analysis

| Feed Stock | A | B | C |
|---|---|---|---|
| Component, vol.% | | | |
| Para-xylene | 5.0 | 5.0 | 5.0 |
| Meta-xylene | 5.0 | 5.0 | 5.0 |

| | | | |
|---|---|---|---|
| Ortho-xylene | 5.0 | 5.0 | 5.0 |
| Ethylbenzene | 5.0 | 5.0 | 5.0 |
| Normal-Nonane | 5.0 | 5.0 | 5.0 |
| Iso-octane | 67.5 | | |
| Decalin | | 67.5 | |
| Para-diethylbenzene | 7.5 | 7.5 | 19.2 |
| Meta-diethylbenzene | | | 45.2 |
| Ortho-diethylbenzene | | | 5.6 |
| Iso-butyl-benzene | | | 2.2 |
| Sec-butyl-benzene | | | 2.8 |
| Total: | 100.0 | 100.0 | 100.0 |

Four different adsorbents were used to test the effects of a para-diethylbenzene desorbent upon the adsorption characteristics of a zeolite. All four of the adsorbents used were type X structured zeolites and contained both barium and potassium cations as the exchanged cations present upon the zeolite. The major differences in the zeolites were the barium and potassium ratio and the different sources from which the zeolites were procured and included adsorbents which had been synthesized using techniques especially developed for production of zeolites for xylene separation and adsorbents which had been purchased as commercially available materials and which were generally of the sodium type X configuration.

While this example is limited to barium and potassium exchanged type X zeolites the same effects would be noticed where the type Y zeolite was utilized with both barium and potassium based thereon.

All of the above disclosed cations which can be placed upon the type X or Y zeolites would behave in a substantially similar manner as the barium and potassium exchange zeolites tested herein. The desorbents having boiling points heavier than the feed component $C_8$ aromatics and having an aromatic type configuration excepting for the diethylbenzene materials are in general of inferior quality as desorbents in non-equilibrium adsorptions having a reduced ability to desorb adsorbed feed components from the adsorbent, or being so tenaciously held upon the zeolite when compared to selectively adsorbed component of the feed stock that it is extremely difficult to remove the desorbent from the zeolite after a desorption operations have taken place, or the desorbent may have a selectivity comparable to that of the selectively adsorbed component but it readily degrades the selectivity of the zeolite adsorbent for a selectively adsorbed component of the feed stock when less than equilibrium operating conditions are effected.

Specific analysis of the four adsorbents used in this example are shown in Table V below:

TABLE V

Adsorbents

| Adsorbent | I | II | III | IV |
|---|---|---|---|---|
| Component,[1] wt.% | | | | |
| $K_2O$ | 5.6 | 0.9 | 1.5 | 1.7 |
| BaO | 21.1 | 27.7 | 28.2 | 26.7 |
| $Na_2O$ | 0.9 | 2.0 | 1.7 | 1.3 |
| $Al_2O_3$ | 30.5 | 28.4 | 28.1 | 28.9 |
| $SiO_2$ | 40.1 | 40.3 | 39.1 | 39.7 |

[1] Adsorbent compositions given are based on volatile free basis after subjecting adsorbents to inert purge at 500° until constant weight was achieved.

In the testing the four different adsorbents for the selectivities they have for para-xylene with respect to the other xylene isomers and ethylbenzene three different feed stocks and three different desorbents were utilized to show the differences and advantages achieved using a para-diethylbenzene containing desorbent. A considerable amount of testing was done utilizing feed stock A which contained an iso-octane and para-diethylbenzene mixture and desorbent E which contained para-diethylbenzene diluted in 90 percent iso-octane. Results of testing feed stock A and desorbent E, while showing that a separation would take place, were nevertheless inferior to the operations utilizing para-diethylbenzene and Decalin. The reason for the inferior operations was thought to be because of the difference in the densities of the iso-octane as compared to the para-diethylbenzene and the $C_8$ aromatic hydrocarbons. In processes utilizing the differences in selectivities of the components of feed stock by an adsorbent to selectively separate the components thereof relatively low flow rates are utilized. The density gradients between the diluent and the desorbent and feed stock components when the diluent materials are in relatively high concentrations as compared to the feed stock and the aromatic desorbents tend to mask or alter the sharp concentration gradients required to effect reasonable operations. For these reasons these tests were not reported although they are operable and could be used in a process but are not a preferred mode of operation.

Eight other tests were run using the four different adsorbents previously described in combination with different feed stocks and desorbents to show preferred use of para-diethylbenzene as a diluted material to be used as a desorbent in comparison to the use of para-diethylbenzene in admixture with the other diethylbenzene isomers and butylbenzene.

All of the data generated for tests numbers 1 through 8 of this Example were done under non-equilibrium adsorption conditions. The results of the eight tests are shown in Table VI below:

TABLE VI

Test Data

| Number | 1 | 2 | 3 | 4 | 5 | 6 | 7 | 8 |
|---|---|---|---|---|---|---|---|---|
| Adsorbent Used | I | I | II | II | III | III | IV | IV |
| Feed Stock | C | B | C | B | C | B | C | B |
| Desorbent | D | F | D | F | D | F | D | F |
| Test Temp. °C | 150 | 150 | 150 | 150 | 150 | 150 | 150 | 150 |
| Distance in cc from $C_9$ tracer for: | | | | | | | | |
| Ethylbenzene | 6.95 | 18:7 | 6.5 | 19.5 | 6.6 | 18.5 | 6.4 | 14.9 |
| Para-xylene | 10.9 | 35.1 | 13.6 | 43.4 | 13.7 | 40.3 | 11.8 | 33.1 |
| Meta-xylene | 3.7 | 8.1 | 4.3 | 14.0 | 4.1 | 11.6 | 3.6 | 7.2 |
| Ortho-xylene | 4.3 | 8.4 | 4.7 | 14.5 | 4.1 | 11.1 | 3.6 | 6.5 |
| Selectivity (B) for: | | | | | | | | |
| P/E | 1.6 | 1.9 | 2.1 | 2.2 | 2.1 | 2.2 | 1.8 | 2.2 |
| P/M | 2.9 | 4.4 | 3.2 | 3.1 | 3.3 | 3.5 | 3.3 | 4.6 |
| P/O | 2.5 | 4.2 | 2.9 | 3.0 | 3.3 | 3.7 | 3.3 | 5.1 |

From the data shown in Table VI it is clear that improved results, as far as selectivities are concerned, are seen for para-xylene with respect to ethylbenzene, meta-xylene and ortho-xylene in all of the tests with the sole exception of a slight reduction in the para-to meta-xylene selectivity in going from Test 3 to Test 4. Tests 1, 3, 5 and 7 show that mixed diethylbenzenes can be used as desorbents when non-equilibrium conditions take place. An improvement is seen in the overall selectivities where only para-diethylbenzene is used in admixture with Decalin. This is unexpected because para-diethylbenzene is considered to be the best of the diethylbenzene isomers as far as the ability to desorb para-xylene is concerned under non-equilibrium adsorption. The improved results are noticed when only a 10 percent para-diethylbenzene mixture is present as is seen in Tests 2, 4, 6 and 8. A larger absolute quantity of para-diethylbenzene was present (25.6 percent) when the mixed diethylbenzene desorbent was used in Tests 1, 3, 5 and 7.

It is also noticeable from the analysis of the data from Table VI that the best results were seen for the adsorbents having the lower barium over potassium ratios upon the zeolite, namely, adsorbents 1 and 4.

It is anticipated that the same general results would be noticed when adsorbents were used which contain other cations described above. The effects of para-diethylbenzene as a desorbent material or component of a desorbent would necessarily give the same results.

EXAMPLE IV

In this Example three tests were run in order to show the improved results which are seen when a desorbent which contains para-diethylbenzene and Decalin was compared under similar type operations to a desorbent which contained essentially a 100 percent mixture of the mixed diethylbenzenes.

The testing apparatus which was used was much different than the apparatus used in the previous examples. The apparatus used herein was essentially a pilot plant scale version of a fixed bed apparatus through which fluid flow was directed to maintain countercurrent operations which simulated a moving bed type operation. The apparatus consisted essentially of 24 serially connected sieve chambers having about 44 cc. volume each. Total chamber volume of the apparatus was approximately 1,056 cc. The individual sieve chambers were serially connected to each other with relatively small diameter connecting piping together with auxiliary lines leading to a rotary type valve. The valve has inlet and outlet ports which connected certain of the auxiliary lines which flowed into the conduits connecting the chambers to external input or output lines. By manipulation of the rotary valve together with maintaining given pressure drops and flow rates through the various streams passing into and out of the series of chambers, a countercurrent flow was able to be reproduced in which the adsorbent remains stationary while fluid was flowing throughout the serially connected chambers in a manner which when viewed from any position within the adsorbent chambers was steady countercurrent flow. The moving of the rotary valves was done in a periodic shifting manner. The shifting of the rotary valve was done in order to allow a new operation to take place between the input and output streams on a rotary valve in the new position of the rotary valve. The rotary valve contained a feed input stream through which passed a $C_8$ aromatic hydrocarbon mixture, an extract outlet stream through which passed desorbent material in admixture with the selectively retained component of the feed stock (in this instance para-xylene), a desorbent inlet stream through which passed the various desorbents tested for the different tests of this Example, a flush out stream which was utilized to flush the connecting piping after the extract stream had shifted from this pipe to another position, a raffinate stream through which passed the less selectively retained component of the feed stock (in this instance ortho-xylene, meta-xylene and ethylbenzene) in admixture with desorbent material, and the flush in stream which was used to flush feed components from lines which has previously contained feed material after the feed stock stream had been shifted by the rotary valve to a new advanced position during a new period of operations.

During the testing the temperature of the adsorbent, and the materials passing into the apparatus were maintained at approximately 150° C. with the plant pressure being maintained at about 100 psig. The operations of this type apparatus are quite detailed and it is not considered necessary to go into extremely detailed account of the various operations taking place within the various segments of the adsorbent chambers. In order to better understand the flow taking place in the various tests of this example reference can be made to D. B. Broughton, et al., "The Separation of P-Xylene from $C_8$ Hydrocarbon Mixtures by the Parex Process," presented at the Third Joint Annual Meeting, American Institute of Chemical Engineers and Puerto Rican Institute of Chemical Engineers, San Juan, P.R. May 17, through May 20, 1970. This reference describes in detail the basic operations taking place in the testing apparatus used in this Example.

Two different adsorbents were used in this Example to illustrate the benefits of using para-diethylbenzene desorbent which does not contain any other diethylbenzene isomers. The first adsorbent which was used was identical to adsorbent III which is described in Table V of Example III. The second adsorbent which was used was labeled as adsorbent V and was analyzed to determine the various components present within the zeolite after the adsorbent had been subjected to a 500° C. temperature with an inert purge until constant weight had been achieved. The results are shown in Table VII below:

TABLE VII

Adsorbent Analysis

| Adsorbent | V |
|---|---|
| Component, wt.% | |
| $K_2O$ | 3.2 |
| BaO | 25.6 |
| $Na_2O$ | 0.7 |
| $Al_2O_3$ | 29.2 |
| $SiO_2$ | 41.0 |

The feed stock used in this Example was essentially a pure $C_8$ aromatic hydrocarbon heart-cut which contained about 32.6 vol. percent ethylbenzene, 14.3 vol. percent para-xylene, 35.5 vol. percent meta-xylene and about 17.6 vol. percent of ortho-xylene. This feed stock was used for all tests.

The desorbents which were used consisted of two types; the first was identical to desorbent D described in Table III of Example III while the other desorbent (labeled G) consisted of approximately 32 vol. percent para-diethylbenzene diluted in about 68 vol. percent of Decalin. The various desorbents were used to show the benefits afforded by using para-diethylbenzene in a diluted form.

Three tests were run in this Example to show the different efficiencies and extraction purities which resulted in the use of a diluted para-diethylbenzene desorbent material. "Efficiency" is determined by calculating the amount of para-xylene which is lost through the raffinate stream, determining this quantity as a percentage of the para-xylene fed to the process and subtracting this percentage from 100 which gives a figure generally in the range of from about 80 to 100 and represents the percentage of para-xylene which is fed to the process which is not lost to the raffinate stream. It is assumed in a calculation of efficiency that the para-xylene which is present in the flush out streams and the extract of the streams is easily recoverable. The purity of the para-xylene present in the extract stream can be noticed by analyzing the $C_8$ distribution of the extract stream and in many cases this number approaches 100 vol. percent.

The test results are shown in Table VIII below.

TABLE VIII

| Test | 9 | 10 | 11 |
|---|---|---|---|
| Adsorbent | II | II | V |
| Flow Rates | | | |
| Feed in, cc/hr. at 150°C. & 100 psig | 53 | 49 | 51 |
| Flush in | 19 | 19 | 39 |
| Desorbent in | 558 | 589 | 237 |
| Flush out | 6 | 6 | 28 |
| Extract out | 75 | 75 | 57 |
| Raffinate out | 549 | 576 | 242 |
| Extract | | | |
| $C_8$ vol.% | 10.5 | | 7.9 |
| Distribution | | | |
| Ethylbenzene vol.% | 18.7 | 0.9 | 0.2 |
| Para-xylene vol.% | 73.4 | 98.0 | 99.4 |
| Meta-xylene vol.% | 2.4 | 0.4 | 0.2 |
| Ortho-xylene vol.% | 5.5 | 0.6 | 0.2 |
| Raffinate | | | |
| $c_8$ vol.% | 5.8 | 7.3 | 16.6 |
| Distribution | | | |
| Ethylbenzene vol.% | 35.0 | 37.6 | 38.4 |
| Para-xylene vol.% | 1.4 | 3.0 | tr |
| Meta-xylene vol.% | 39.5 | 38.4 | 38.1 |
| Ortho-xylene vol.% | 24.1 | 20.9 | 23.5 |
| Efficiency, % | 94 | 82 | 100 |
| Desorbent type | D | D | E |

Test 9 and test 10 utilized the same adsorbent while test 11 utilized a different type adsorbent material. It is thought that the difference in the adsorbents between tests 9 and 10 and test 11 would only result in minor changes in the data as presented and would not alter the data to the extent that the conclusions reached would not be valid. In test 9 the pilot plant unit was operated at such conditions that the relatively high efficiency was obtained — namely, about 94 vol. percent. This relatively high efficiency, as can be seen by the extract $C_8$ aromatic distribution, resulted in a reduction of the purity of the para-xylene withdrawn via the extract stream to about 73.4 vol. percent. In test 10 the pilot plant unit was operated at conditions which produced a relatively low efficiency of about 82 vol. percent with a relatively high para-xylene extract purity in the range of about 98 vol. percent. By altering the input and output streams passing into and out of the process, the characteristics of the flow patterns could be slightly altered to effect either the high efficiency with relatively low para-xylene purity or a relatively high para-xylene with relatively low efficiency operations. Both tests 9 and 10 utilized desorbent D which was the mixed diethylbenzene desorbent mixture. The results obtained from tests 9 and 10 indicate that when using normal operations in the pilot plant it was not possible to obtain both the relatively high efficiency with a relatively high para-xylene purity when using the mixed diethylbenzene desorbents. The mixed diethylbenzenes desorbents are operable but it is believed that the meta- diethylbenzene, ortho-diethylbenzene and other $C_{10}$ aromatics which are present in this desorbent degrade the adsorbents ability to effectively extract at a high rate and maintain high para-xylene extract purity.

Test 11 utilized a desorbent material which comprise roughly 32 vol. percent para-diethylbenzene in admixture with about 68 vol. percent Decalin which was used as an inert diluent. The results of test 11 indicate that essentially 100 percent efficiency operations were obtained with an extract $C_8$ purity of approximately 99.4 vol. percent The fact that both extract purity and high efficiency operations are achieved in a system where a para-diethylbenzene desorbent which is diluted is utilized indicates that the para-diethylbenzene is superior to the mixed concentration of diethylbenzene when used as a desorbent.

The desorbent which was used in test 11 contained a absolute percentage of about 32 vol. percent of para-diethylbenzene while the desorbent used in test 9 and 10 contain only about 25 vol. percent para-diethylbenzene in admixture with the other diethylbenzene isomers. It is thought that the superior results of the operations shown in test 11 are not as a result of the slight increase in the volume percent of para-diethylbenzene in desorbent G as compared to desorbent D, but are due primarily to the absence of the ortho-diethylbenzene, meta-diethylbenzene and butylbenzene. Additionally, it is noted that desorbent flow rate used in test 11 was much lower than the desorbent flow rate used in test 9 and 10. This flow rate is due to the slightly altered operating conditions between tests 11 and tests 9 and 10 and does not appreciably account for the relatively high purities and high efficiencies which are noted in test 11 which are primarily the result of the para-diethylbenzene desorbent.

The above Examples are illustrative of a specific embodiment of the process of this invention and are not considered as undue limitations on the scope of the attached claims.

EMBODIMENT

A broad embodiment of the process of this invention resides in a process for the separation of para-xylene from a feed mixture containing a mixture of $C_8$ aromatic hydrocarbons which process employs a crystalline aluminosilicate adsorbent containing a selected cation or cations at the cationic sites within the zeolite; said process comprising an adsorption and a desorption step to effectively separate para-xylene from a feed stock material while producing an extract stream containing a concentrated quantity of para-xylene and a raffinate stream containing a para-xylene depleted mixture which adsorption operations and desorption operations are effected to provide an improved separation which employs a desorbent material containing para-diethylbenzene.

I claim as my invention:

1. In an improved process for the separation of para-xylene from a feed containing a mixture of $C_8$ aromatic hydrocarbons, which process employs a crystalline alumino-silicate adsorbent selected from the group consisting of Type X and Type Y structured zeolites containing a selected cation or cations at the exchangeable cationic sites within said zeolite, said process comprising the steps of:
   i. contacting said adsorbent with said hydrocarbon feed in the presence of desorbent at less than equilibrium adsorption conditions at which desorbent remains within the adsorbent while feed hydrocarbons are being adsorbed by the adsorbent, to effect the selective adsorption of para-xylene by the adsorbent while simultaneously removing a raffinate material from the adsorbent which comprises the less selectively adsorbed components of the feed;
   ii. contacting said adsorbent with a desorbent material at desorption conditions to effect the displacing of said para-xylene from said adsorbent while simultaneously removing extract material from said adsorbent comprising desorbent and para-xylene; the improvement which comprises employing a desorbent material containing para-diethylbenzene.

2. The process of claim 1 further characterized in that said adsorbent contains at least one cation selected from the group consisting of lithium, sodium, potassium, beryllium, magnesium, calcium, strontium, barium, nickel, copper, silver, manganese, cadmium and combinations thereof.

3. The process of claim 2 further characterized in that said desorbent contains from about 10 vol. percent to about 60 vol. percent para-diethylbenzene.

4. The process of claim 2 further characterized in that said adsorbent contains pairs of cations selected from the group consisting of potassium and barium, potassium and beryllium, potassium and magnesium, rubidium and barium, cesium and barium, potassium and rubidium, and, potassium and cesium.

5. The process of claim 2 further characterized in that said adsorbent contains barium cations as the major cation at the cationic exchangeable sites within the adsorbent.

6. The process of claim 2 further characterized in that said feed comprises para-xylene, meta-xylene and ethylbenzene.

7. The process of claim 6 further characterized in that said feed comprises ortho-xylene.

8. The process of claim 2 further characterized in that said adsorbent contains barium and potassium cations.

9. The process of claim 8 further characterized in that said adsorbent contains a weight ratio of barium to potassium of from about 1 to about 30.

10. The process of claim 2 further characterized in that said desorbent material contains para-diethylbenzene in admixture with a saturated hydrocarbon.

11. The process of claim 10 further characterized in that said saturated hydrocarbon is a paraffin.

12. The process of claim 10 further characterized in that said saturated hydrocarbon is a cycloparaffin.

13. The process of claim 10 further characterized in that said saturated hydrocarbon is decahydronaphthalene.

14. The process of claim 10 further characterized in that said admixture contains from about 10 vol. percent to about 60 vol. percent para-diethylbenzene with said saturate.

15. In an adsorptive separation process for the separation of para-xylene from a hydrocarbon feed containing a mixture of $C_8$ aromatic hydrocarbons wherein a desorbent is used which has a higher boiling point than the $C_8$ aromatic hydrocarbons of said feed which process comprises the steps of:
   i. contacting said hydrocarbon feed with a crystalline aluminosilicate adsorbent selected from the group of Type X or Type Y zeolites containing a selected cation or cations at the exchangeable cationic sites within said zeolite in the presence of desorbent at less than equilibrium adsorption conditions allowing a competitive but selective adsorption of para-xylene with respect to the desorbent for the adsorptive sites on the adsorbent;
   ii. removing a raffinate material from said adsorbent which contains the less selectively adsorbed components of the feed;
   iii. contacting said adsorbent with desorbent material at desorption conditions to effect displacing of said para-xylene from said adsorbent; and,
   iv. removing from said adsorbent an extract material comprising desorbent material and para-xylene; the improvement which comprises employing a desorbent containing para-diethylbenzene.

16. The process of claim 15 further characterized in that said feed stock contains para-xylene and meta-xylene.

17. The process of claim 16 further characterized in that said adsorbent contains cations or cation pairs selected from the group consisting of potassium, rubidium, cesium, sodium, barium, silver, potassium and barium, potassium and beryllium, potassium and magnesium, rubidium and barium, cesium and barium, potassium and rubidium, and potassium and cesium.

18. The process of claim 17 further characterized in that said desorbent material comprises para-diethylbenzene in admixture with a saturated hydrocarbon.

19. The process of claim 18 further characterized in that said saturate is a paraffin.

20. The process of claim 18 further characterized in that said saturate is a cycloparaffin.

21. The process of claim 18 further characterized in that said saturate is decahydronaphthalene.

22. The process of claim 16 further characterized in that said feed stock contains ethylbenzene.

23. The process of claim 22 further characterized in that said adsorbent contains cation or cations pairs selected from the group consisting of potassium, sodium, barium, silver, potassium and barium, potassium and beryllium, potassium and magnesium, rubidium and barium, cesium and barium, potassium and rubidium, and potassium and cesium.

24. The process of claim 23 further characterized in that said desorbent material comprises para-diethylbenzene in admixture with a saturated hydrocarbon.

25. The process of claim 23 further characterized in that said saturate is a cycloparaffin.

26. The process of claim 23 further characterized in that said saturate is decahydronaphthalene.

27. The process of claim 23 further characterized in that said adsorbent contains barium at a major portion of the exchangeable cationic sites within the zeolite.

28. The process of claim 23 further characterized in that said adsorbent contains a weight ratio of barium to potassium of from about 1 to about 30.

* * * * *